US010223071B2

(12) United States Patent
Rao

(10) Patent No.: US 10,223,071 B2
(45) Date of Patent: Mar. 5, 2019

(54) ENERGY-EFFICIENT VARIABLE POWER ADDER AND METHODS OF USE THEREOF

(71) Applicant: QUALCOMM Incorporated, San Diego, CA (US)

(72) Inventor: Hari Rao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 14 days.

(21) Appl. No.: 15/488,019

(22) Filed: Apr. 14, 2017

(65) Prior Publication Data

US 2018/0300107 A1 Oct. 18, 2018

(51) Int. Cl.
*G06F 7/502* (2006.01)
*G06F 7/505* (2006.01)
*G06F 7/506* (2006.01)

(52) U.S. Cl.
CPC .............. *G06F 7/502* (2013.01); *G06F 7/505* (2013.01); *G06F 7/506* (2013.01); *G06F 2207/5063* (2013.01)

(58) Field of Classification Search
None
See application file for complete search history.

(56) References Cited

U.S. PATENT DOCUMENTS

| 5,204,832 A | 4/1993 | Nakakura |
| 5,278,783 A | 1/1994 | Edmondson |
| 5,912,832 A | 6/1999 | Flahie et al. |
| 6,985,917 B2 * | 1/2006 | Elbe ................. G06F 9/3001 708/230 |
| 7,424,507 B1 | 9/2008 | Pasqualini |
| 7,461,107 B2 | 12/2008 | Grinchuk |
| 8,661,072 B2 | 2/2014 | Blaner et al. |
| 2006/0212505 A1 * | 9/2006 | Islam ................. G06F 7/5312 708/620 |
| 2009/0271465 A1 | 10/2009 | Pistorius et al. |

OTHER PUBLICATIONS

Brent R.P., et al., "A Regular Layout for Parallel Adders", IEEE Transactions on Computers, 1982, vol. 31, Issue 3, pp. 144-147.
Han T., et al., "Fast Area-Efficient VLSI Adders", Proceedings of IEEE Symposium on Computer Arithmetic, 1987, pp. 49-56.
Knowles S., "A Family of Adders", Proceedings. 15th IEEE Symposium on Computer Arithmetic, 2001, pp. 277-284.

(Continued)

*Primary Examiner* — Michael D. Yaary
(74) *Attorney, Agent, or Firm* — Haynes and Boone, LLP

(57) ABSTRACT

A multi-bit adder apparatus comprising: a full adder stage configured to receive at least some of a plurality of least significant bits (LSBs) of first data and second data; and a half adder stage configured to receive at least some of a plurality of most significant bits (MSBs) of the first data and the second data; a carry generation stage coupled to the full adder stage and the half adder stage, wherein the carry generation stage includes at least one serial propagate-generate (PG) component; and a post summing stage coupled to the carry generation stage and the half adder stage and configured to generate a partial sum output of the first data and the second data, wherein a number of the at least some of the plurality of LSBs is different from a number of the at least some of the plurality of MSBs.

30 Claims, 9 Drawing Sheets

(56) References Cited

OTHER PUBLICATIONS

Kogge P.M., et al., "A Parallel Algorithm for the Efficient Solution of a General Class of Recurrence Equations", IEEE Transactions and Computers, Aug. 1973, pp. 786-793.
Ladner R.E., et al., "Parallel Prefix Computation", Journal of the Association for Computing Machinery, vol. 27, No. 4, Oct. 1980, pp. 831-838.
Sklansky J., et al., "Conditional-Sum Addition Logic", IRE Transactions and Electronic Computers, 1960, pp. 226-231.
Alshewimy M.A.M., et al., "FPGA-based New Hybrid Adder Design with the Optimal Bit-Width Configuration", International Journal of Computer Applications (0975-8887), Mar. 2013, vol. 65, No. 11, pp. 15-19.
International Search Report and Written Opinion—PCT/US2018/024785—ISA/EPO—dated Jul. 18, 2018.
Rani G., et al., "Delay Analysis of Parallel-Prefix Adders", International Journal of Science and Research, Jun. 1, 2014, XP055297044, Retrieved from the Internet: URL:https://www.ijsr.net/archive/v3i6/MDiwMTQ30DC=.pdf [retrieved on Aug. 23, 2016], pp. 2339-2342.

\* cited by examiner

ENERGY-EFFICIENT VARIABLE POWER ADDER AND METHODS OF USE THEREOF

TECHNICAL FIELD

This application relates to digital circuit for performing arithmetic operations and, more particularly, to adders having variable configurations for improving energy efficiency.

BACKGROUND

Adders are widely used in multimedia subsystems such as cameras and graphics processors as addition is an important function for many digital signal processing operations. For example, digital filtering can be implemented using repetitive steps of multiply-add operations. Other mathematical operations such as subtraction, sign inversion, multiplication, division, comparison, square-root, logarithmic, hyperbolic, trigonometric may also include various steps of additions.

Conventional circuit synthesizing software tools commonly focus on optimizing area and/or speed instead of power, especially for adders and multipliers. For example, a conventional circuit synthesizing software tool may synthesize an adder using a ripple carry adder (RCA). The software tool may optimize processing delays by replacing the RCA with a carry-skip adder, a carry-look-ahead adder, or a carry-select adder to meet timing constraints. However, carry-skip adders, carry-look-ahead adders, and carry-select adders typically use more logics than RCAs, and thus consume more power than RCAs. While some circuit synthesizing software tools may provide some controls for power consumption, the controls may not be effective or sufficient to meet power constraints for certain applications. The high power consumption may not be a great concern when the synthesized circuit is used in a host system or host machine, such as a personal computer (PC). However, mobile devices that are used for multimedia applications may be limited by power. Accordingly, improved systems and techniques for synthesizing adders that can balance speed, power, and/or area may be desirable.

SUMMARY

Energy-efficient multi-bit adders are provided. Various embodiments include adders that use parallel carry circuitry for some of the most significant bit (MSB) stages to provide a speedup and serial or ripple carry circuitry for less significant bit-stages to provide power saving. Speedup refers to the reduction in delay from the time the inputs are received to the time the outputs are computed. Specifically, various embodiments include adders having an uneven split between the number of parallel MSB stages and the number serial less significant bit-stages.

According to one embodiment, a multi-bit adder apparatus including: a full adder stage configured to receive at least some of a plurality of least significant bits (LSBs) of first data and second data; and a half adder stage configured to receive at least some of a plurality of most significant bits (MSBs) of the first data and the second data, wherein the half adder stage includes at least one half adder; a carry generation stage coupled to the full adder stage and the half adder stage, wherein the carry generation stage includes at least one serial propagate-generate (PG) component coupled to outputs of the at least one half adder; and a post summing stage coupled to the carry generation stage and the half adder stage and configured to generate a partial sum output of the first data and the second data, wherein a number of the at least some of the plurality of LSBs is different from a number of the at least some of the plurality of MSBs.

According to an embodiment, an apparatus including: a processing component including a multi-bit adder, wherein the multi-bit adder includes: a full adder stage configured to receive at least some of a plurality of least significant bits (LSBs) of first data and second data; and a half adder stage configured to receive at least some of a plurality of most significant bits (MSBs) of the first data and the second data, wherein the half adder stage includes at least one half adder; a carry generation stage coupled to the full adder stage and the half adder stage, wherein the carry generation stage includes at least one serial propagate-generate (PG) component coupled to outputs of the at least one half adder; and a post summing stage coupled to the carry generation stage and the half adder stage and configured to generate a partial sum output of the first data and the second data, wherein a number of the at least some of the plurality of LSBs is different from a number of the at least some of the plurality of MSBs.

According to another embodiment, a method includes: generating, via at least one full adder, an intermediate carry output based on at least some of a plurality of least significant bits (LSBs) of first data and second data; generating, via at least one half adder, a current propagate output and a current generate output based on at least some of a plurality of most significant bits (MSBs) of the first data and the second data, wherein a number of the at least some of the plurality of MSBs is different from a number of the at least some of the plurality of LSBs; generating, via at least one serial propagate-generate (PG) component, a serial propagate output and a serial generate output based on at least the current propagate output and the current generate output; and generating a partial sum output based on at least the serial propagate output, the serial generate output, the current propagate output, and the intermediate carry output.

According to another embodiment, an apparatus includes: means for generating an intermediate carry output based on at least some of a plurality of least significant bits (LSBs) of first data and second data; means for generating a current propagate output and a current generate output based on at least some of a plurality of most significant bits (MSBs) of the first data and the second data, wherein a number of the at least some of the plurality of MSBs is different from a number of the at least some of the plurality of LSBs; means for generating a serial propagate output and a serial generate output based on at least the current propagate output and the current generate output; and means for generating a partial sum output based on at least the serial propagate output, the serial generate output, the current propagate output, and the intermediate carry output.

DETAILED DESCRIPTION

Example Circuit Embodiments

Figure 1:
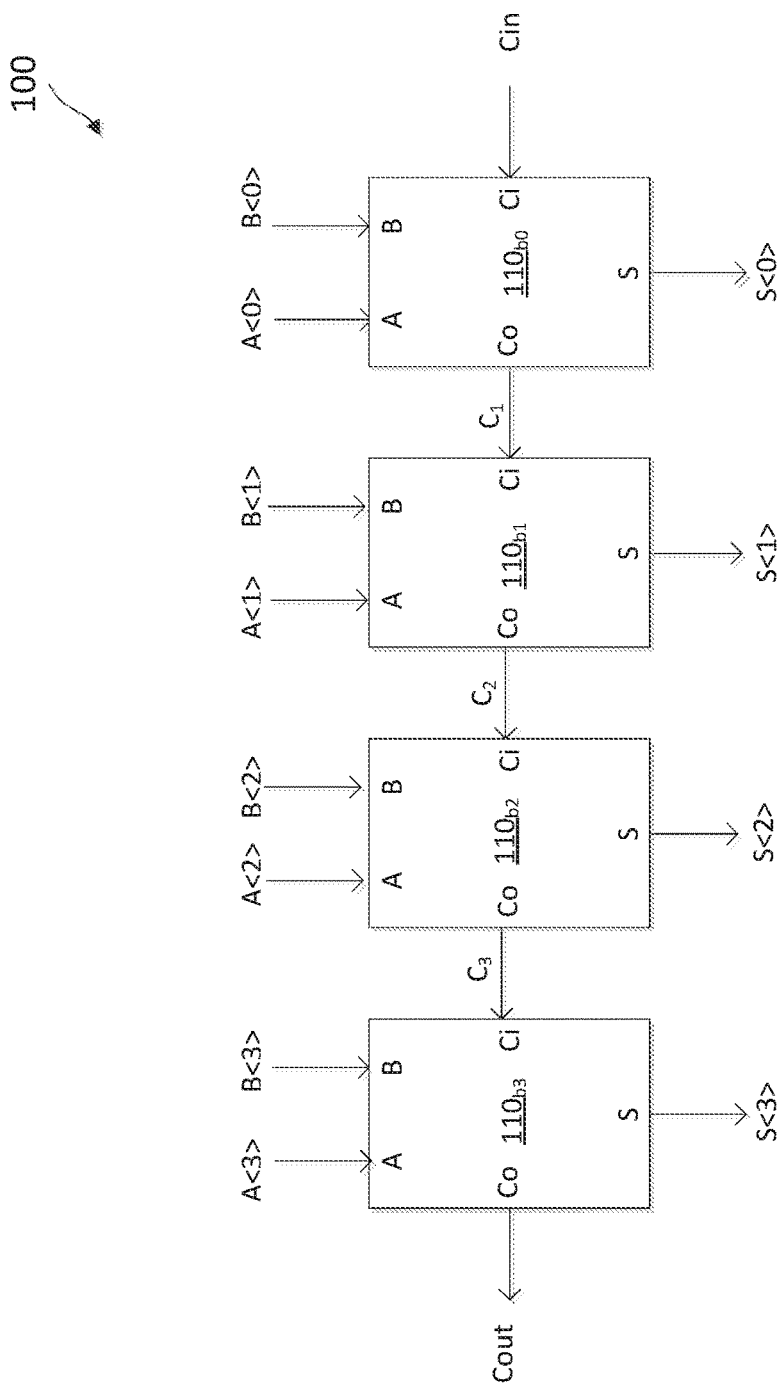
FIG. 1 is an illustration showing a ripple carry adder (RCA), according to one embodiment

Various embodiments provide energy-efficient adders by varying the degree of parallelism for the adders based on a power-delay product (PDP) metric instead of a single power metric or a single delay metric. For example, an adder can be configured to use parallel carry circuitry for some of the MSB stages and serial carry circuitry for remaining less significant bit-stages. The parallel circuitry is referred to as speedup circuitry. The degree of parallelism is adjusted during design time by varying the number of parallel MSB stages that use the speedup circuitry. In one embodiment, an adder includes a full adder (FA) stage, a half adder (HA) stage, a carry generation stage, and a post summing stage. The FA stage includes serial carry circuitry and operates on LSBs. The HA stage, the carry generation stage, and the post summing stage include parallel carry circuitry and operates on MSBs.

In the example embodiment above, the FA stage is configured to receive LSBs of first data and second data. The FA stage includes one or more serial FAs configured to generate partial sums and an intermediate carry output from the received LSBs. The HA stage is configured to receive MSBs of the first data and the second data and performs bitwise PG. The HA stage includes one or more parallel HAs, each configured to generate a sum output and a carry output for a MSB input pair. Each input pair is formed from a bit of the first data and a bit from the second data, where the bits are of the same order of magnitude. The sum output may be analogous to a propagate output of a propagate-generate (PG) network. The carry output may be analogous to a generate output of a PG network. In some embodiments, at least a portion of the HA stage can operate in parallel with the FA stage.

Continuing with the example embodiment above, the carry generation stage includes a serial PG stage and a parallel PG stage. The serial PG stage includes one or more serial PG components. Each serial PG component is coupled to the outputs of an HA and configured to output the propagate and generate outputs of the HA or the propagate and generate outputs of a next lower bit-order or a next least significant HA based on the propagate output of the HA. In some embodiments, at least a portion of the serial PG stage can operate in parallel with the FA stage. The parallel PG stage includes one or more parallel PG components. Each parallel PG component is coupled to the outputs of a serial PG component and the FA stage and configured to output the generate output of the serial PG component or the intermediate carry output of the FA stage based on the propagate output of the serial PG component. The output of the most significant parallel PG component may correspond to a final carry output for the summation of the first data and the second data.

Continuing with the example embodiment above, the post summing stage includes one or more parallel summing components. Each summing component is coupled to the output of the parallel PG component and configured to add the generate output of the parallel PG component to the propagate output of an HA of the same bit-order or same significance to produce a partial sum. The partial sums produced by the summing components correspond to MSBs of the sum of the first data and the second data.

Further embodiments may include the adder described above in a computing device. For example, the computing device may further include a computational component coupled to the adder. The computational component can be configured to perform fixed-point operations and/or floating-point operations, which may interface with the adder for additions. In some embodiments, the computing device may include a multitude of adders with different degree of parallelisms.

Various embodiments may include advantages over conventional systems. For instance, various embodiments may be used during a design phase to allow a circuit designer to select adders having an appropriate amount of parallelism to satisfy timing constraints but still treat enough digits with ripple carry mechanisms to save power and space. That allows for an energy-efficient design that can also be custom tailored to meet a particular timing constraint. For instance, the designer may incrementally increase the number of MSB stages with the speedup circuitry until an adder meets a certain PDP constraint. Then, the adder may be compiled using standard cells and released as a unit or a tray. The tray can keep the cells or circuitry of the adder physically close to each other on a floor plan, and thus may further improve speed, area, and power consumption. The various embodiments may provide precise control of speedup versus power in a fine granularity (e.g., in steps of a bit-stage) for adder design. While the disclosed embodiments are described in the context of 4-bit adders, the disclosed embodiments can be applied to any multi-bit adders, such as a 3-bit adder, an 8-bit adder, a 16-bit adder, and a 32-bit adder.

FIG. 1 is an illustration showing an RCA 100, according to one embodiment. FIG. 1 illustrates the RCA 100 as a 4-bit adder for purposes of simplicity of discussion, though it will be recognized that embodiments of the present disclosure can scale to add more or fewer number of bits. The RCA 100 includes a plurality of full adders (FAs) 110. The FAs 110 are shown as $110_{b0}$, $110_{b1}$, $110_{b2}$, and $110_{b3}$. Each FA 110 includes three input ports, denoted as A, B, and Ci, and two output ports, denoted as S and Ci. For each FA 110, the input port A is configured to receive a bit from a first operand and the input port B is configured to receive a bit from a second operand. The input bits received at the input ports A and B are of equal magnitude or significance. The input port Ci is configured to receive a carry-out bit from a next least significant or low bit-order FA 110. Each FA 110 is configured to add input bits received from the input ports A, B, and Ci to produce a sum and a carry-out at the output ports S and Ci, respectively. The FAs 110 can be implemented using any suitable circuit configurations. In some embodiments, Boolean factoring and/or Boolean transform techniques can be applied to reduce transistor count, delay, and/or power. For example, the FAs 110 can be implemented using pass gates, transmission gates, pass gates, and/or domino gates.

As an example, the RCA 100 adds a first operand A to a second operand B to produce a result or sum S and a carry-out bit Cout. The first operand A includes 4 bits, denoted as A<0>, A<1>, A<2>, and A<3> from LSB to MSB. The second operand B includes 4 bits, denoted as B<0>, B<1>, B<2>, and B<3> from LSB to MSB. The result S includes 4 bits, denoted as S<0>, S<1>, S<2>, and S<3> from LSB to MSB. During a first period, the FA $110_{b0}$ adds a carry-in bit, denoted as Cin, to an LSB A<0> of the first operand A and an LSB B<0> of the second operand B to produce a least significant result bit S<0> of the result S and a first carry-out bit, denoted as $C_1$. During a next period, the FA $110_{b1}$ adds the carry-out bit $C_1$, a next MSB A<1> of the first operand A, and a next MSB B<1> of the second operand B to produce a next most significant result bit S<1> and a second carry-out bit, denoted as $C_2$. This procedure is repeated until the carry-out bit, denoted as $C_3$, is added to the MSB A<3> of the first operand A and the MSB B<3> of the second operand B to produce a most significant result bit S<3> and a post carry output or final carry-out bit, denoted as Cout.

As can be seen, the carry-out bit of each FA 110 is a carry-in of a next most significant FA 110, and thus each FA 110 may not begin until the completion of a previous least significant FA 110. Thus, there is a time delay between the generation of the least significant result bit S<0> and the most significant result bit S<3>. As such, the time delay of an N-bit RCA is in the order of N.

Figure 2:
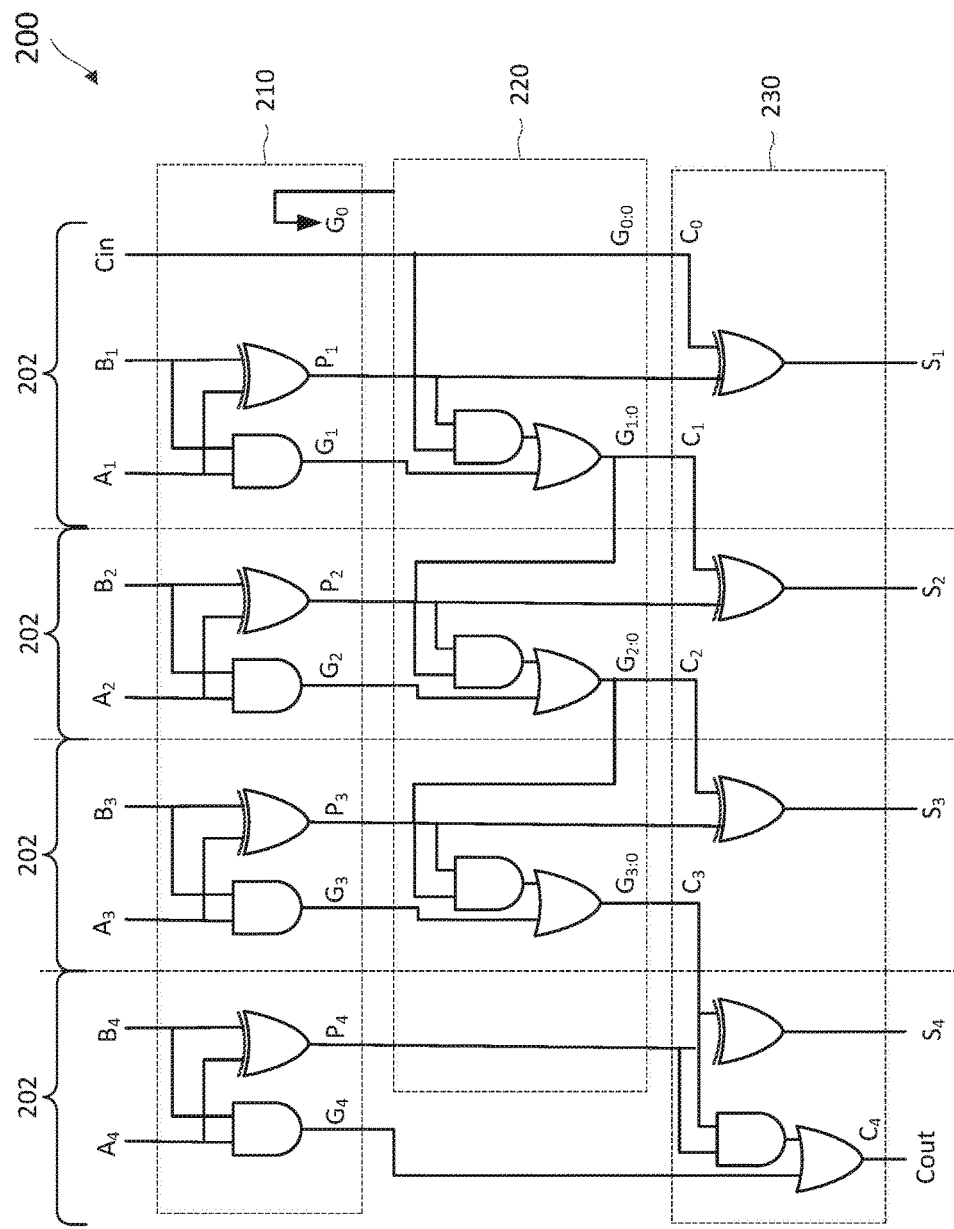
FIG. 2 is an illustration showing a logic gate level implementation of an RCA, according to one embodiment.

FIG. 2 is an illustration showing a logic gate level implementation of an RCA 200 similar to the RCA 100, according to one embodiment. The RCA 200 includes a bitwise PG generation stage 210, a group PG generation stage 220, a post sum generation stage 230, and bit-stages 202. The number of bit-stages 202 depends on the bit-widths of the operands. The bit-stages 202 spans across the bitwise PG generation stage 210, the group PG generation stage 220, and the post sum generation stage 230. Each bit-stage 202 corresponds to an FA 110 of the RCA 100.

For each $i^{th}$ bit-stage 202, the bitwise PG generation stage 210 is configured to generate a generate output, denoted as $G_i$, and a propagate output, denoted as $P_i$, for each pair of input bits, denoted as $(A_i, B_i)$, where $A_i$ and $B_i$ corresponds to an operand A bit and an operand B bit, respectively, of equal magnitude. The generate output $G_i$ and propagate output $P_i$ may be implemented using a logical-AND gate and an exclusive-OR gate, respectively, and are expressed as shown below:

$$G_i = A_i \cdot B_i, \quad (1)$$

$$P_i = A_i \oplus B_i, \quad (2)$$

where i varies from 1 to N and N represents the number of bit-stages 202. The generate output $G_i$ indicates whether a carry is generated for the $i^{th}$ bit-stage 202. A carry is generated when both input bits $A_i$ and $B_i$ are true or have values of ones. The propagate output $P_i$ indicates whether the carry $C_{i-1}$ received from a previous $(i-1)^{th}$ bit-stage 202 is propagated to the current $i^{th}$ bit-stage 202. The propagate output $P_i$ is true when either $A_i$ or $B_i$ is true. The bitwise PG stage 210 can generate the generate outputs (e.g., $G_0$, $G_1$, $G_2$, and $G_3$) and the propagate outputs (e.g., $P_0$, $P_1$, $P_2$, and $P_3$) for all the bit-stages 202 in parallel.

For each $i^{th}$ bit-stage 202, the group PG generation stage 220 is configured to generate a group generate output, denoted as $G_{i:0}$ or $C_i$, based the generate output $G_i$ and the propagate output $P_i$ of the $i^{th}$ bit-stage 202 and the generate output $G_{i-1}$ and the propagate output $P_{i-1}$ of the next low bit-order or significant $(i-1)^{th}$ bit-stage 202. When the propagate output $P_i$ is false, the group PG generation stage 220 outputs the generate output $G_i$ at the group generate output $G_{i:0}$. Conversely, when the propagate output $P_i$ is true, the group PG generation stage 220 outputs the previous generate output $G_{i-1:0}$ at the group generate output $G_{i:0}$. The group generate output $G_{i:0}$ can be implemented using logical-AND gates and logical-OR gates and are expressed as shown below:

$$G_{i:0} = C_i = G_i + P_i \cdot G_{i-1:0}. \quad (3)$$

The group PG generation stage 220 generates the group generate output (e.g., $G_{0:0}$, $G_{1:0}$, $G_{2:0}$, and $G_{3:0}$) serially.

For each $i^{th}$ bit-stage 202, the post sum generation stage 230 is configured to generate a sum, denoted as $S_i$. In addition, the post sum generation stage 230 generates a final carry-out, denoted as Cout or $C_4$, at the most significant bit-stage 202. The sum $S_i$ can be implemented using exclusive-OR gates and is expressed as shown below:

$$S_i = C_i + P_i. \quad (4)$$

The final carry-out Cout can be implemented using a logical-AND gate and a logical-OR gate and is expressed as shown below:

$$\text{Cout} = C_N + P_N \cdot C_{N-1}. \quad (5)$$

While the RCA 200 implements additions using parallel prefix operations, the group generate outputs (e.g., the carry) ripple serially from the LSB to the MSB, and thus may have a slow performance. As such, the RCA 200 may not meet the timing constraints of some applications. Other adder designs, such as carry-skip adders, carry-look-ahead adders, and/or carry-select adders, may include parallel computation for carries, and thus may improve the processing speed or time delay. However, such adder designs may use more transistors and are less power-efficient and/or less area-efficient than the RCA 200.

Figure 3:
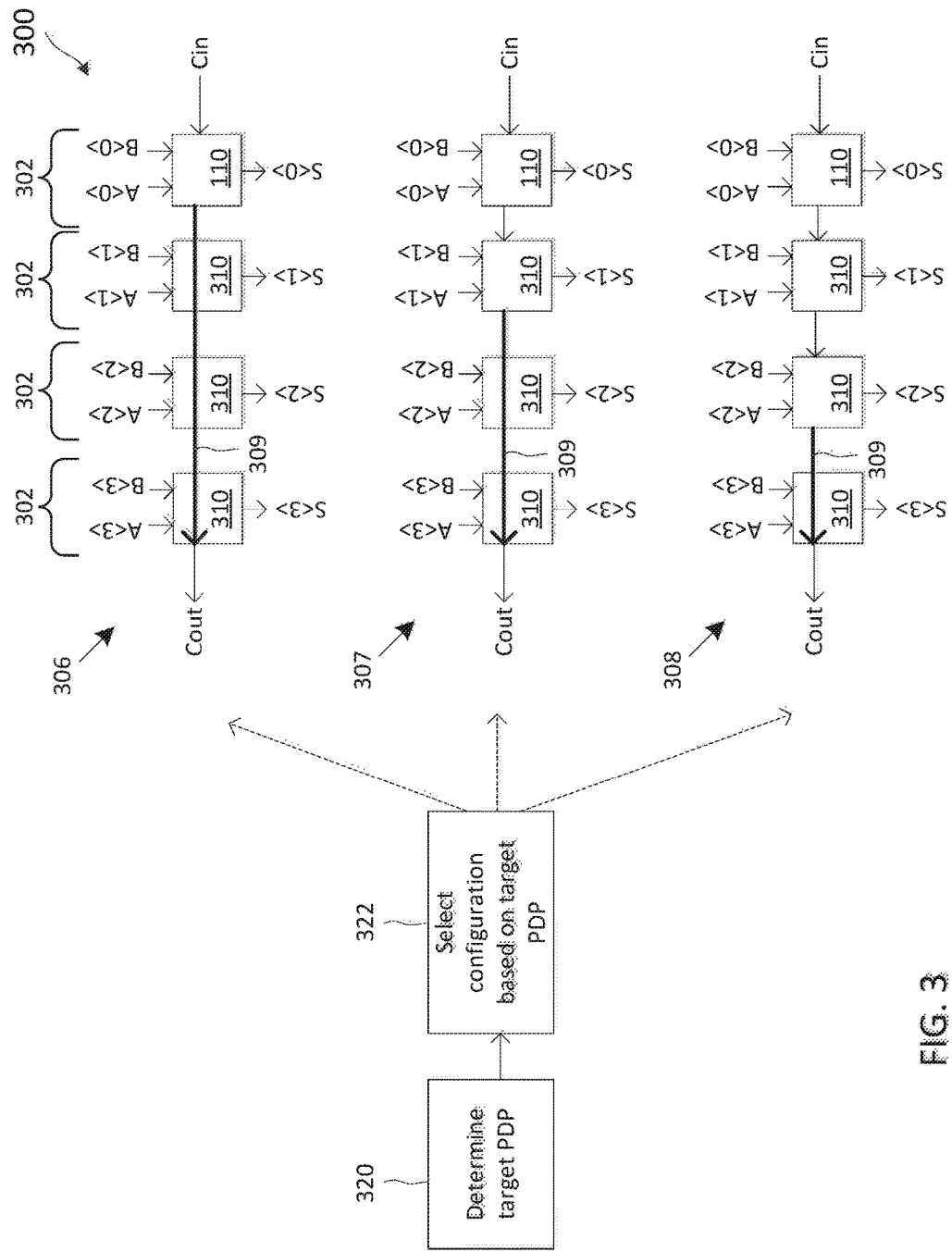
FIG. 3 shows a variable power adder configuration scheme, according to one embodiment.

FIG. 3 shows a variable power adder configuration scheme 300, according to one embodiment. The scheme 300 configures adders based on a target PDP metric instead of based on a target power or a target delay alone. The PDP metric is a measure of Watts per megahertz (MHz), and thus is indicative of power efficiency. The scheme 300 employs parallel PG-based adders 310 with parallel carry circuitry for a number of MSBs and serial carry circuitry, such as the FAs 110, for remaining number of LSBs to trade off speed for power savings. While the scheme 300 is illustrated in the context of a 4-bit adder with three speedup configurations 306, 307, and 308, the scheme 300 can be applied to an N-bit adder with 1 to N−1 speedup configurations, where N is a positive integer greater than 1.

As an example, each configuration 306, 307, and 308 adds a first operand A to a second operand B to produce a sum S and a carry-out bit Cout. The configurations 306, 307, and 308 provide incremental steps of power-delay tradeoffs. The first operand A includes 4 bits, denoted as A<0>, A<1>, A<2>, and A<3> from LSB to MSB. The second operand B includes 4 bits, denoted as B<0>, B<1>, B<2>, and B<3> from LSB to MSB. The result S includes 4 bits, denoted as S<0>, S<1>, S<2>, and S<3> from LSB to MSB.

The configuration 306 uses one FA 110 to add the LSB input pair (A<0>, B<0>) and parallel PG-based adders 310 to provide a speedup for the three MSB stages 302. The configuration 306 is referred to as a speedup-three configuration. The parallel PG-based adders 310 may include various stages of PG computations as described in greater detail herein. As shown, a first parallel PG-based adder 310 operates on the input pair (A<1>, B<1>), a second parallel PG-based adder 310 operates on the input pair (A<2>, B<2>), and a third parallel PG-based adder 310 operates on the input pair (A<3>, B<3>). The first, second, and third parallel PG-based adders 310 operate in parallel to compute intermediate carries as shown by the arrow 309. The first, second, and third parallel PG-based adders 310 can operate in parallel with the FA 110. While the parallel PG-based adders 310 can provide a speedup or improve the time delay, the parallel PG-based adders 310 include more transistor logics, and thus may consume more power than using FAs 110.

The configuration 307 uses two FAs 110 to add the two LSB pairs (A<0>, B<0>) and (A<1>, B<1>) and uses parallel PG-based adders 310 to provide a speedup in the next two MSB stages 302. Thus, the configuration 307 is referred to as a speedup-two configuration. As shown, a first parallel PG-based adder 310 operates on the input pair (A<2>, B<2>) and a second parallel PG-based adder 310 operates on the input pair (A<3>, B<3>). The first and second parallel PG-based adders 310 operate in parallel to compute intermediate carries as shown by the arrow 309. The FAs 110 operate serially, but may operate in parallel with the parallel PG-based adders 310. While the configuration 307 provides less speedup than the configuration 306, the configuration 307 is more energy-efficient than the configuration 306.

The configuration 308 uses three FAs 110 to operate on the three LSB pairs (A<0>, B<0>), (A<1>, B<1>), and (A<2>, B<2>) and uses a parallel PG-based adder 310 to provide a speedup in the MSB stage 302. Thus, the configuration 308 is referred to as a speedup-one configuration. The parallel PG-based adder 310 operates on the input pair (A<3>, B<3>) to compute an intermediate carry as shown by the arrow 309. Similar to the configuration 307, the FAs 110 operate serially, but may operate in parallel with the parallel PG-based adder 310. While the configuration 308 provides less speedup than the configurations 306 and 307, the configuration 308 may be more energy-efficient than both configurations 306 and 307. The scheme 300 can further include a configuration with no speedup, for example, a speedup-zero configuration, which degenerates into the same configuration as the RCA 100.

To configure an adder based on a target PDP, at action 320, the scheme 300 determines a target PDP, for example, based on timing and power constraints for a particular application and/or device. At action 322, the scheme 300 selects an adder configuration from the configurations 306, 307, and 308 based on the determined target PDP. As can be seen, the configurations 306, 307, and 308 provide a variable power-speed tradeoff in steps of bit-stages 302. Thus, the scheme 300 can be used in adder design to tradeoff speed for power saving in incremental steps. To further improve energy efficiency, the scheme 300 can generate the FAs 110 and the parallel PG-based adders 310 for a particular configuration 306, 307, or 308 as a unit or a tray. As such, the circuit components or cells for the FAs 110 and parallel PG-based adders 310 can be located close to each other on a floor plan instead of scattered.

Figure 4:
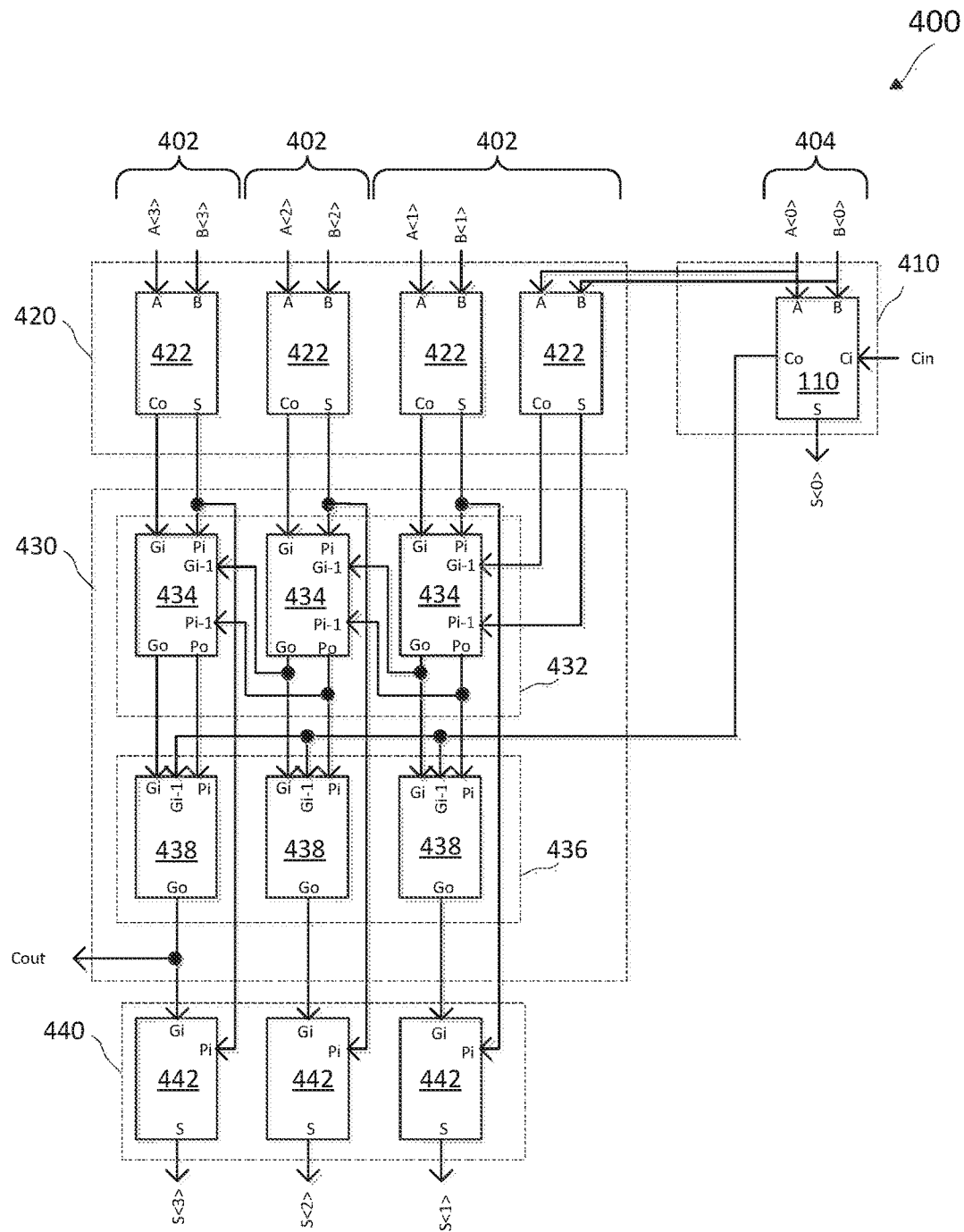
FIG. 4 is an illustration of an example 4-bit adder that applies speedup to three MSB stages, according to one embodiment.

FIG. 4 is an illustration of an example 4-bit adder 400 that applies speedup to three MSB stages 402, according to one embodiment. The adder 400 has a similar configuration as the configuration 306 and provides a more detailed view of the internal components and interconnections of the parallel PG-based adders 310 in the configuration 306. The adder 400 includes an FA stage 410, an HA stage 420, a carry generation stage 430, and a post summing stage 440. The FA stage 410 operates on the LSBs of an operand A and an operand B. The operand A can be represented from LSB to MSB as A<0>, A<1>, A<2>, and A<3>. The operand B can be represented from LSB to MSB as B<0>, B<1>, B<2>, and B<3>. The HA stage 420, the carry generation stage 430, and the post summing stage 440 correspond to the parallel PG-based adders 310 and operate on the three MSBs of the operand A and the three MSBs of the operand B.

The FA stage 410 includes an FA 110 in the LSB stage 404. The FA 110 receives A<0>, B<0>, and a carry input, denoted as Cin, at the input ports A, B, and Ci, respectively. The FA 110 computes a sum of the input pair (A<0>, B<0>) and produces a least significant sum bit, denoted as S<0>, at the output port S and an intermediate carry of the sum at the output port Co.

The HA stage 420 is coupled to the FA stage 410. The HA stage 420 includes a plurality of HAs 422 configured to compute bitwise PG. Each MSB stage 402 includes a corresponding HA that operates on an input pair (A<1>, B<1>), (A<2>, B<2>), or (A<3>, B<3>). The least significant MSB stage 402 includes an additional HA 422 that operates on the input pair (A<0>, B<0). Each HA 422 includes input ports, denoted as A and B, and output ports, denoted as Co and S. The input port A is configured to receive a bit from the operand A. The input port B is configured to receive a bit from the operand B. The input bits received at the input ports A and B are of equal magnitude or significance. Each HA 422 is configured to generate a generate output at the output port Co from the received input bits according to equation (1) and generate a propagate output at the output port S from the received input bits according to equation (2). Since the operations of the HAs 422 are independent of each other, the HAs 422 can be configured as parallel circuitry. In addition, the operations of the HAs 422 are independent of the FA stage 410. Thus, the HAs 422 can be configured to operate in parallel with the FA stage 410. For example, the HAs 422 and the FA 110 can include parallel operational components.

The carry generation stage 430 is coupled to the HA stage 420 and the FA stage 410. The carry generation stage 430 includes a serial PG stage 432 and a parallel PG stage 436. The serial PG stage 432 includes a plurality of serial PG components 434, one in each MSB stage 402. Each serial PG component 434 includes input ports, denoted as Gi, Pi, Gi−1, and Pi−1, and output ports, denoted as Go and Po. The input ports Gi and Pi are coupled to the output ports Co and S, respectively, of an HA 422 of a current bit-order or a current MSB stage 402. The input ports Gi−1 and Pi−1 are coupled to the output ports Go and Po, respectively, of a serial PG component 434 of a next lower bit-order or a previous MSB stage 402. However, the input ports Gi−1 and Pi−1 of the least significant serial PG component 434 are coupled to the output ports Co and S, respectively, of the least significant HA 422. Each serial PG component 434 is configured to output the generate output and the propagate output of the HA of the current bit-order or propagate the generate output and the propagate output of a serial PG component 434 of a next lower bit-order based on the input received at the input port Pi. The internal circuitry of the serial PG components 434 is described in greater detail herein. Since the operation of each serial PG component 434 is dependent on a serial PG component 434 of a next lower bit-order, the serial PG components 434 are configured to operate serially. However, some of the serial PG components 434 can operate in parallel with the FA stage 410 depending on the timings of the FA stage 410 and the HA stage 420.

The parallel PG stage 436 includes a plurality of parallel PG components 438, one in each MSB stage 402. Each parallel PG component 438 includes input ports, denoted as Gi, Pi, and Gi−1, and an output port, denoted as Go. The input ports Gi and Pi are coupled to the output ports Go and Po respectively, of a serial PG component 434 of a current bit-order. The input ports Gi−1 is coupled to the output port Co of the FA 110. Each parallel PG component 438 is configured to output the generate output of the serial PG component of the current bit-order or the intermediate carry output by the FA 110 based on the input received at the input port Pi. The internal circuitry of the parallel PG components 438 is described in greater detail herein. Since the operations of the parallel PG components 438 are independent of each other, the parallel PG components 438 may be configured to operate in parallel. The output of the parallel PG component 438 of the highest bit-order corresponds to a post carry output or final carry output, denoted as Cout.

The post summing stage 440 is coupled to the HA stage 420 and the carry generation stage 430. The post summing stage 440 includes a plurality of summing components 442, one in each MSB stage 402. Each summing component 442 includes input ports, denoted as Gi and Pi, and an output port, denoted as S. The input port Gi is coupled to the output port Go of a parallel PG component 438 of a current bit-order. The input port Pi is coupled to the output port S of an HA 422 of the current bit-order. Each summing component 442 is configured to generate a partial sum output at the output port S from inputs received at the input ports Gi and Pi. As shown, the summing components 442 generate the three most significant sum bits, denoted as S<1>, S<2>, and S<3>. The internal circuitry of the summing component 442 is described in greater detail herein.

As can be seen, the speedup is provided by the parallel operations among the HAs 422, the parallel operations between the FA stage 410 and the HA stage 420, the parallel operations between the FA stage 410 and the serial PG stage 432, the parallel operations among the parallel PG components 438, and/or the parallel operations among the summing components 442.

Figure 5:
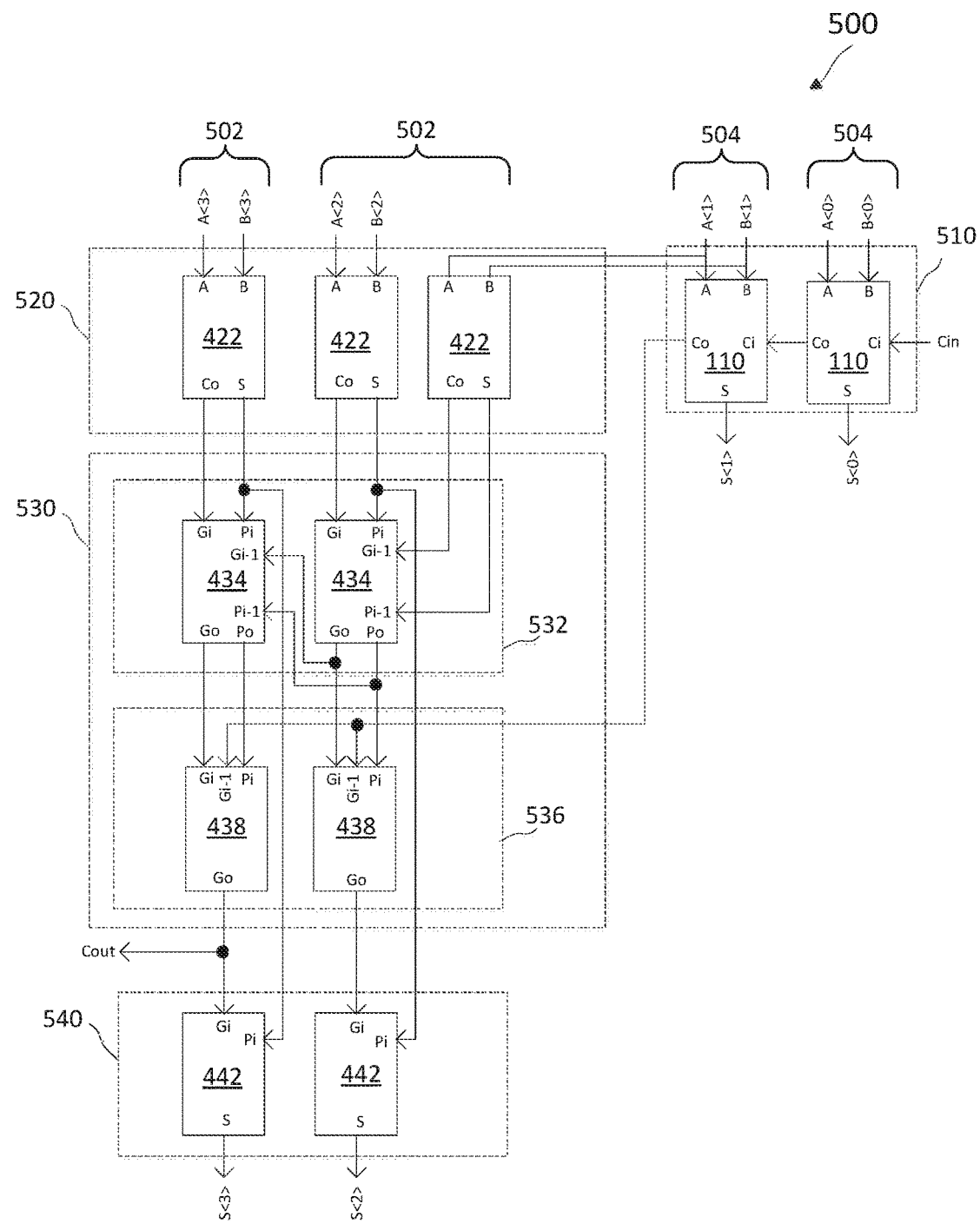
FIG. 5 is an illustration of an example 4-bit adder that applies speedup to two MSB stages, according to one embodiment.

FIG. 5 is an illustration of an example 4-bit adder 500 that applies speedup to two MSB stages 502, according to one embodiment. The adder 500 has a similar configuration as the configuration 307 and provides a more detailed view of the internal components and interconnections of the parallel PG-based adders 310 in the configuration 307. The adder 500 includes an FA stage 510, an HA stage 520, a carry generation stage 530, and a post summing stage 540, where the carry generation stage 530 includes a serial PG stage 532 and a parallel PG stage 536. The FA stage 510, the HA stage 520, the serial PG stage 532, the parallel PG stage 536, and the post summing stage 540 are substantially similar to the FA stage 410, the HA stage 420, the serial PG stage 432, the parallel PG stage 436, and the post summing stage 440. However, the HA stage 520, the serial PG stage 532, the parallel PG stage 536, and the post summing stage 540 operate on two MSB stages 502 to provide a 2-bit speedup, and the FA stage 510 operates on remaining two LSB stages 504 to provide power saving.

The FA stage 510 includes two FAs 110 configured to operate on the two LSB input pairs (A<0>, B<0>) and (A<1>, B<1>). The FA 110 in the most significant LSB stage 504 produces an intermediate carry at the output port Co.

The HA stage 520 includes two HAs 422 configured to operate on the two MSB input pairs (A<2>, B<2>) and (A<3>, B<3>). The HA stage 520 further includes a third HA 422 in the least significant MSB stage 502 configured to operate on the most significant LSB pair (A<1>, B<1>) operated by the FA stage 510. The HAs 422 are parallel HAs and can operate in parallel with the FA stage 510.

The serial PG stage 532 includes two serial PG components 434 configured to operate on the two MSB input pairs (A<2>, B<2>) and (A<3>, B<3>). The serial PG components 434 can operate in parallel with the FA stage 510. The parallel PG stage 536 includes two parallel PG components 438 configured to operate on the two MSB input pairs (A<2>, B<2>) and (A<3>, B<3>) and the intermediate carry output by the FA stage 510.

The post summing stage 540 includes two summing components 442 configured to operate on the two MSB input pairs (A<2>, B<2>) and (A<3>, B<3>) and the propagate outputs at the output ports S of the HAs 422.

Figure 6:
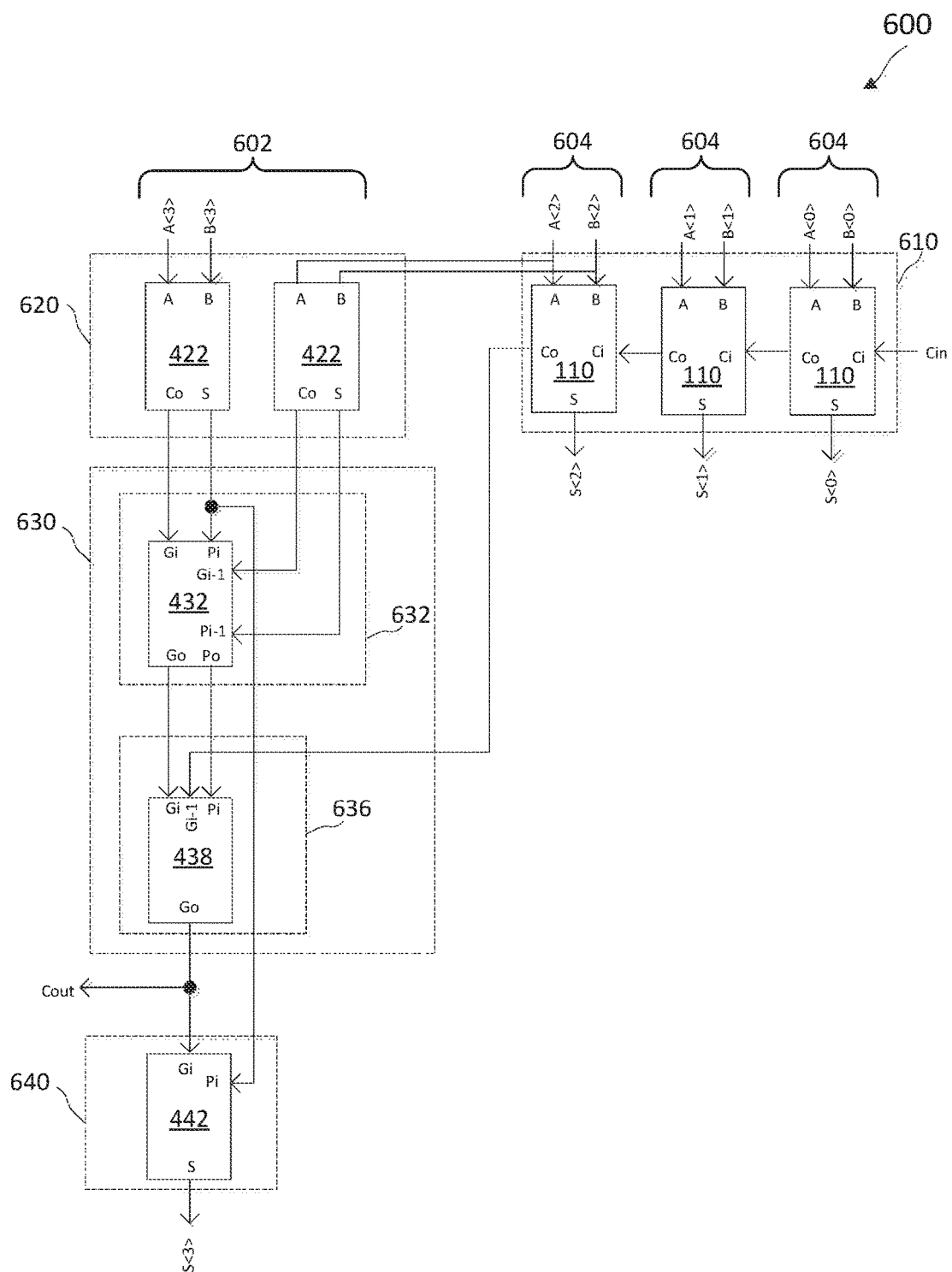
FIG. 6 is an illustration of an example 4-bit adder that applies speedup to one MSB stage, according to one embodiment.

FIG. 6 is an illustration of an example 4-bit adder 600 that applies speedup to one MSB stage 602, according to one embodiment. The adder 600 has a similar configuration as the configuration 308 and provides a more detailed view of the internal components and interconnections of the parallel PG-based adders 310 in the configuration 308. The adder 600 includes an FA stage 610, an HA stage 620, a carry generation stage 630, and a post summing stage 640, where the carry generation stage 630 includes a serial PG stage 632 and a parallel PG stage 636. The FA stage 610 is substantially similar to the FA stages 410 and 510. The HA stage 620 is substantially similar to the HA stages 420 and 520. The serial PG stage 632 is substantially similar to the serial PG stages 432 and 532. The parallel PG stage 636 is substantially similar to the parallel PG stages 436 and 536. The post summing stage 640 is substantially similar to the post summing stages 440 and 540. However, the HA stage 620, the serial PG stage 632, the parallel PG stage 636, and the post summing stage 640 operate on the MSB stage 602 to provide a 1-bit speedup, and the FA stage 610 operates on remaining three LSB stages 604.

The FA stage 610 includes three FAs 110 configured to operate on the three LSB input pairs (A<0>, B<0>), (A<1>, B<1>), (A<2>, B<2>). The FA 110 in the most significant LSB stages 604 produces an intermediate carry at the output port Co.

The HA stage 620 includes one HA 422 configured to operate on the MSB input pair (A<3>, B<3>). The HA stage 620 further includes a third HA 422 in the least significant MSB stage 602 configured to operate on the MSB input pair (A<2>, B<2>) of the LSBs operated by the FA stage 610. The HAs 422 are parallel HAs and can operate in parallel with the FA stage 610.

The serial PG stage 632 includes one serial PG components 434 configured to operate on the MSB input pair (A<3>, B<3>). The serial PG components 434 can operate in parallel with the FA stage 610. The parallel PG stage 636 includes one parallel PG components 438 configured to operate on the MSB input pair (A<3>, B<3>) and the intermediate carry output by the FA stage 610. The post summing stage 640 includes one summing components 442 configured to operate on the MSB input pair (A<3>, B<3>) and the propagate outputs at the output port S of the HAs 422.

Figure 7:
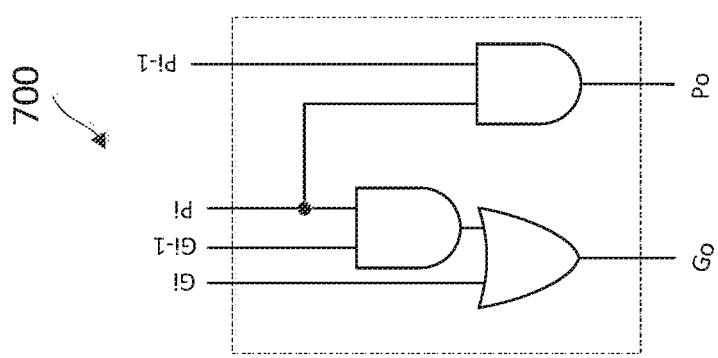
FIG. 7 is an illustration of an example serial PG component, according to one embodiment.

FIG. 7 is an illustration of an example serial PG component 700, according to one embodiment. The serial PG component 700 is similar to the serial PG component 434 and provides a more detailed view of the internal components and interconnections of the serial PG component 434. The serial PG component 700 includes input ports, denoted as $G_i$, $P_i$, $G_{i-1}$, and $P_{i-1}$, and output ports, denoted as $G_o$ and $P_o$. The serial PG component 700 generates an output signal at the output port $G_o$ based on input signals received from the input ports $G_i$, $P_i$, and using a logical-AND gate and a logical-OR gate expressed as shown below:

$$G_o = G_i + P_i \cdot G_{i-1}. \quad (6)$$

The serial PG component 700 generates an output signal at the output port $P_o$ based on input signals received from the input ports $G_i$, $P_i$, and $P_{i-1}$ using a logical AND gate expressed as shown below:

$$P_o = P_i \cdot P_{i-1}. \tag{7}$$

As such, when the input signal at the input $P_i$ is false, the serial PG component 700 outputs the input signals received from the input ports $G_i$ and $P_i$ to the output ports $G_o$ and $P_o$, respectively. Otherwise, the serial PG component 700 outputs the input signals received at the input ports and $P_{i-1}$ to the output ports $G_o$ and $P_o$, respectively.

Figure 8:
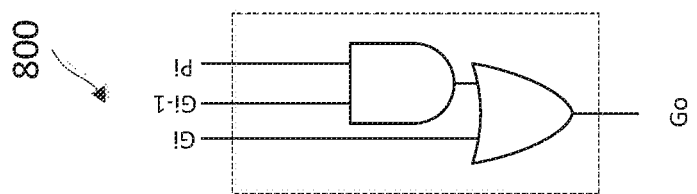
FIG. 8 is an illustration of an example parallel PG component, according to one embodiment.

FIG. 8 is an illustration of an example parallel PG component 800, according to one embodiment. The parallel PG component 800 is similar to the parallel PG component 438 and provides a more detailed view of the internal components and interconnections of the parallel PG component 438. The parallel PG component 800 includes input ports, denoted as $G_i$, $P_i$, and $G_{i-1}$, and an output port, denoted as $G_o$. The parallel PG component 800 generates an output signal at the output port $G_o$ based on input signals received from the input ports $G_i$, $P_i$, and using a logical-AND gate and a logical-OR gate expressed as shown below:

$$G_o = G_i + P_i \cdot G_{i-1}. \tag{8}$$

As such, when the input signal at the input P, is false, the parallel PG component 800 outputs the input signal received from the input ports G, to the output port $G_o$. Otherwise, the parallel PG component 800 outputs the input signal received at the input port $G_{i-1}$ to the output ports $G_o$.

Figure 9:
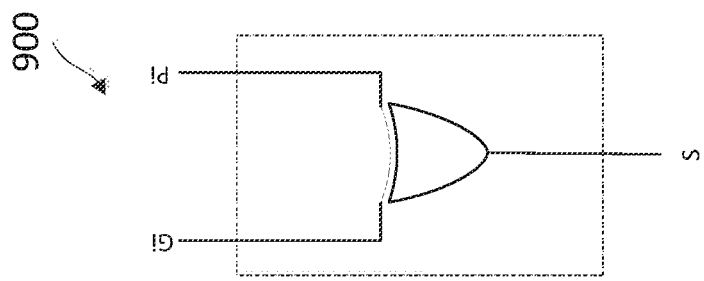
FIG. 9 is an illustration of an example summing component, according to one embodiment.

FIG. 9 is an illustration of an example summing component 900, according to one embodiment. The summing component 900 is similar to the summing component 442 and provides a more detailed view of the internal components and interconnections of the summing component 442. The summing component 900 includes input ports, denoted as $G_i$ and $P_i$, and an output port, denoted as S. The summing component 900 generates an output signal at the output port S based on input signals received from the input ports $G_i$ and $P_i$ using an exclusive-OR gate expressed as shown below:

$$S = G_i \oplus P_i. \tag{9}$$

Figure 10:
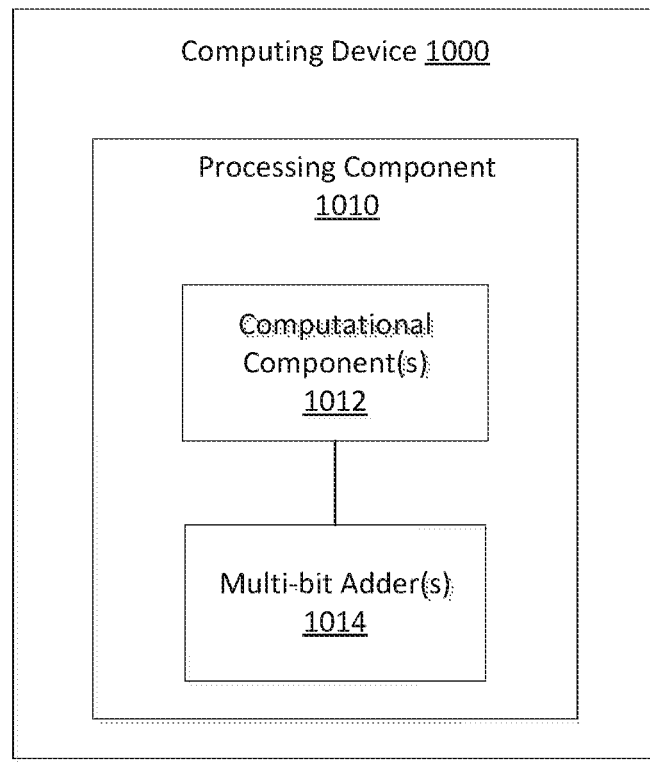
FIG. 10 is an illustration of an example computing device, according to one embodiment.

FIG. 10 is an illustration of an example computing device 1000, according to one embodiment. The computing device 1000 can be a mobile device, a multimedia device, or any device that may be power limited. The computing device 1000 includes a processing component 1010. The processing component 1010 includes one or more computational components 1012 and one or more multi-bit adders 1014. The multi-bit adders 1014 can be configured according to the scheme 300 and may have similar configurations as configurations 306, 307, and 308 and the adders 400, 500, and 600. In an embodiment, at least one multi-bit adder 1014 has an uneven split of speedup MSB stages and ripple carry LSB stages. For example, the multi-bit adder 1014 may be a K-bit adder and may include N speedup MSB stages and (K−N) ripple carry LSB stages, where N and (K−N) are not equal. In some embodiments, the multi-bit adders 1014 may have different speedup architectures. For example, one multi-bit adder 1014 may have three speedup MSB stages, another multi-bit adder 1014 may have two speedup MSB stages, and yet another multi-bit adder 1014 may have zero speedup stages. The computing device 1000 may further includes memory, input ports, output ports, bus subsystem, clock subsystem, power subsystem, and any application-specific subsystem.

The computational component 1012 may include logics and circuitries configured to perform floating-point operations and/or fixed-point operations. The floating-point operations and/or the fixed-point operations may include subtraction, multiplication, division, sign inversion, and/or comparison. The computational component 1012 may be further configured to compute hyperbolic, square-root, trigonometric, logarithmic functions, and/or any advanced mathematical function.

The computational component 1012 is coupled to the multi-bit adders 1014. The computational component 1012 may perform at least some of the operations using additions computed by the multi-bit adders 1014. As an example, the computational component 1012 may be configured to perform multiplication, where a multiplicand is multiplied by a multiplier. The multiplication may include multiplying the multiplicand with each binary digit of the multiplier to produce partial products and summing the partial products to produce a final product. In an embodiment, the multi-bit adders 1014 can be configured to add the partial products to produce the final product. In another embodiment, binary digits of equal magnitudes across the partial products are added to produce a set of carry bits and a set of sum bits, for example, by using carry-save adders. The set of carry bits can form a vector and the set of sum bits can form another vector. In such an embodiment, the multi-bit adders 1014 can be configured to add the vector of carry bits to the vector of sum bits to produce the final product.

Example methods of use for the circuits of FIGS. 4-10 will now be discussed.

Example Methods of Use

Figure 11:
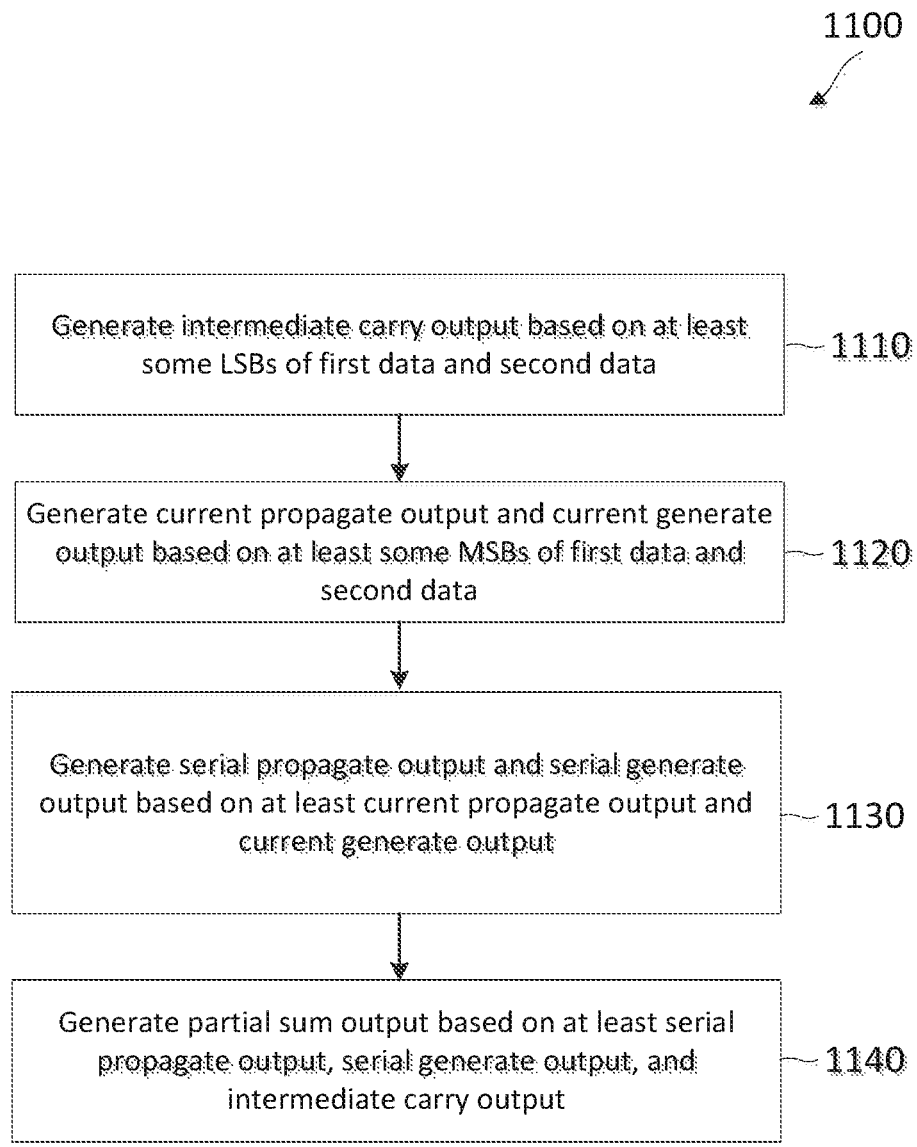
FIG. 11 is a flow diagram for an example method of performing a multi-bit addition based on a predetermined power-delay metric, according to one embodiment.

FIG. 11 is a flow diagram for an example method 1100 of performing a multi-bit addition based on a predetermined power-delay metric, according to one embodiment. The method 1100 may be performed by the adders illustrated in FIGS. 3-6. In the example method 1100, the actions are performed with respect to the configurations in FIGS. 3-6. Specifically, the adder is configured according to a PDP metric, for example, a target PDP, using the scheme 300. The number of speedup MSB stages is selected to meet the predetermined PDP metric. For example, during a circuit design phase, a circuit designer may begin with a power-efficient RCA such as the RCAs 100 and 200 with no speedup MSB stage and incrementally increase the number of speedup MSB stages until the adder meets both the timing constraint and the power constraint of a respective power-delay metric.

The adder receives first data and second data. Each first data and second data may include a number of binary bits. The first data may correspond to the operand A and the second data may correspond to the operand B in the examples of FIGS. 4-6. The adder may have an uneven split between the number of speedup MSB stages (e.g., the MSB stages 402, 502, and 602) and ripple carry LSB stages (e.g., the LSB stages 404, 504, and 604). The actions described below at blocks 1110-1140 are performed for the first data and the second data.

The method 1100 begins at block 1110, which includes generating an intermediate carry output based on at least some LSBs of the first data and the second data, for example, via at least one FA such as the FAs 110. The intermediate carry output corresponds to the carry-out generated by the most significant FA 110.

At block 1120, the method 1100 includes generating a current propagate output and a current generate output based on at least some MSBs of the first data and the second data, for example, via at least one HA such as the HAs 422. The current propagate output and the current generate output may correspond to the outputs at the output ports S and Co, respectively, of an HA 422 at an $i^{th}$ bit-stage in the examples of FIGS. 4-6.

At block 1130, the method 1100 includes generating a serial propagate output and a serial generate output based on at least the current propagate output and the current generate output, for example, via a serial PG component such as the serial PG components 434 and 700. The serial propagate output and the serial generate output may correspond to the outputs at the output ports Po and Go, respectively, of a serial PG component 434 at the $i^{th}$ bit-stage in the examples of FIGS. 4-6.

The generating the serial propagate output and the serial generate output includes propagating the current propagate output and the current generate output to the serial propagate output and the serial generate output, respectively, when the current propagate output is false. The generating the serial propagate output and the serial generate output includes propagating the previous propagate output and the previous generate output to the serial propagate output and the serial generate output, respectively, when the current propagate output is true.

In one embodiment, the previous generate output and previous propagate output correspond to the generate output and the propagate output, respectively, of a serial PG component in an $(i-1)^{th}$ bit-stage, for example, operating on next lower bit-order MSBs of the first data and the second data. In another embodiment, the previous generate output and previous propagate output correspond to the carry output and the sum output, respectively, of an HA operating on MSBs of the at least some LSBs of the first data and the second data.

At block 1140, the method 1100 includes generating a partial sum output based on at least the serial propagate output, the serial generate output, and the intermediate carry output. The partial sum output may correspond to the output at the output port S of a summing component 442 at the $i^{th}$ bit-stage in the examples of FIGS. 4-6. For example, a parallel generate output can be generated based on the serial propagate output and the serial generate output using a parallel PG component such as the parallel PG component 438 and the partial sum output can be generated based on the parallel generate output and the current propagate output.

The scope of embodiments is not limited to the specific method shown in FIG. 11. Other embodiments may add, omit, rearrange, or modify one or more actions. For instance, the actions of block 1110, in which the intermediate carry output is generated, and the actions of block 1120, in which the current propagate output and the current generate output are generated, may occur concurrently. Alternatively, the actions of block 1110, in which the intermediate carry output is generated, and the actions of block 1130, in which the serial propagate output and the serial generate output are generated, may occur concurrently. In other words the arrangement of blocks in method 1100 is not limited to a specific order of actions.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

The invention claimed is:

1. A multi-bit adder apparatus comprising:
   a full adder stage configured to receive at least some of a plurality of least significant bits (LSBs) of first data and second data;
   a half adder stage configured to receive at least some of a plurality of most significant bits (MSBs) of the first data and the second data, wherein the half adder stage includes at least one half adder;
   a carry generation stage coupled to the full adder stage and the half adder stage, wherein the carry generation stage includes at least one serial propagate-generate (PG) component coupled to outputs of the at least one half adder; and
   a post summing stage coupled to the carry generation stage and the half adder stage and configured to generate a partial sum output of the first data and the second data,
   wherein a number of the at least some of the plurality of LSBs is different from a number of the at least some of the plurality of MSBs.

2. The multi-bit adder apparatus of claim 1, wherein the full adder stage includes at least one full adder, and wherein the at least one full adder and the at least one half adder comprise parallel operational components.

3. The multi-bit adder apparatus of claim 1, wherein the full adder stage includes at least one full adder, and wherein the at least one full adder and the at least one serial PG component comprise parallel operational components.

4. The multi-bit adder apparatus of claim 1, wherein the half adder stage includes a plurality of half adders that comprise parallel operational components.

5. The multi-bit adder apparatus of claim 4, wherein a number of the plurality of half adders is associated with a target power delay product (PDP) metric.

6. The multi-bit adder apparatus of claim 1, wherein the outputs of the at least one half adder includes a current propagate output and a current generate output, wherein the half adder stage includes a second half adder that is a next high bit-order half adder of the at least one half adder, wherein the second half adder is configured to produce a previous propagate output and a previous generate output based on the at least some of the plurality of MSBs, and wherein the serial PG component is further coupled to the current propagate output, the current generate output, the previous propagate output, and the previous generate output.

7. The multi-bit adder apparatus of claim 6, wherein the serial PG component includes:
   a first logical-AND gate including:
      input ports coupled to the current propagate output and the previous propagate output; and
      an output port producing a serial propagate output;
   a second logical-AND gate including inputs ports coupled to the current propagate output and the previous generate output; and
   a first logical-OR gate including:
      input ports coupled to an output of the second logical-AND gate and the current generate output; and
      an output port producing a serial generate output.

8. The multi-bit adder apparatus of claim 7, wherein the full adder stage includes at least one full adder configured to produce an intermediate carry output based on the at least some of the plurality of LSBs, and wherein the carry generation stage further includes at least one parallel PG component including:
    a third logical-AND gate including input ports coupled to the serial propagate output and the intermediate carry output; and
    a second logical-OR gate including:
        input ports coupled to an output of the third logical-AND gate and the serial generate output; and
        an output port producing a post carry output.

9. The multi-bit adder apparatus of claim 8, wherein the post summing stage includes an exclusive-OR gate including:
    input ports coupled to the post carry output and the current propagate output of the at least one half adder; and
    an output port producing the partial sum output.

10. An apparatus comprising:
    a processing component including a multi-bit adder, wherein the multi-bit adder includes:
        a full adder stage configured to receive at least some of a plurality of least significant bits (LSBs) of first data and second data; and
        a half adder stage configured to receive at least some of a plurality of most significant bits (MSBs) of the first data and the second data, wherein the half adder stage includes at least one half adder;
        a carry generation stage coupled to the full adder stage and the half adder stage, wherein the carry generation stage includes at least one serial propagate-generate (PG) component coupled to outputs of the at least one half adder; and
        a post summing stage coupled to the carry generation stage and the half adder stage and configured to generate a partial sum output of the first data and the second data,
    wherein a number of the at least some of the plurality of LSBs is different from a number of the at least some of the plurality of MSBs.

11. The apparatus of claim 10, wherein the processing component further includes at least one computational component coupled to the multi-bit adder, and wherein the at least one computational component is associated with at least one of a fixed-point operation or a floating-point operation.

12. The apparatus of claim 11, wherein the at least one computational component is associated with a multiplication, and wherein the computational component is configured to generate at least two partial products forming the first data and the second data.

13. The apparatus of claim 10, wherein the full adder stage includes at least one full adder, and wherein the at least one full adder and the at least one half adder comprise parallel operational components.

14. The apparatus of claim 10, wherein the full adder stage includes at least one full adder, and wherein the at least one full adder and the at least one serial PG component comprise parallel operational components.

15. The apparatus of claim 10, wherein the outputs of the at least one half adder includes a current propagate output and a current generate output, wherein the half adder stage includes a second half adder that is a next high order half adder of the at least one half adder, wherein the second half adder is configured to produce a previous propagate output and a previous generate output based on the at least some of the plurality of MSBs, wherein the serial PG component is configured to propagate the previous propagate output or the current propagate output to a serial propagate output based on the current propagate output, and wherein the serial PG component is configured to propagate the previous generate output or the current generate output to a serial generate output based on the current propagate output.

16. The apparatus of claim 15, wherein the full adder stage includes at least one full adder producing an intermediate carry output based on the at least some of the plurality of LSBs, wherein the carry generation stage further includes at least one parallel PG component that is configured to propagate the intermediate carry output or the serial generate output to a post carry output based on the serial propagate output.

17. The apparatus of the claim 16, wherein the post summing stage is configured to generate the partial sum output based on the post carry output and the current propagate output of the at least one half adder.

18. A method comprising:
    generating, via at least one full adder, an intermediate carry output based on at least some of a plurality of least significant bits (LSBs) of first data and second data;
    generating, via at least one half adder, a current propagate output and a current generate output based on at least some of a plurality of most significant bits (MSBs) of the first data and the second data, wherein a number of the at least some of the plurality of MSBs is different from a number of the at least some of the plurality of LSBs;
    generating, via at least one serial propagate-generate (PG) component, a serial propagate output and a serial generate output based on at least the current propagate output and the current generate output; and
    generating a partial sum output based on at least the serial propagate output, the serial generate output, the current propagate output, and the intermediate carry output.

19. The method of claim 18, wherein the generating the current propagate output and the current generate output is in concurrent with the generating the intermediate carry output.

20. The method of claim 18, wherein the generating the serial propagate output and the serial generate output is in concurrent with the generating the intermediate carry output.

21. The method of claim 18, wherein the generating the serial propagate output and the serial generate output includes:
    propagating the current propagate output or a previous propagate output to the serial propagate output based on the current propagate output; and
    propagating the current generate output or a previous generate output to the serial generate output based on the current propagate output.

22. The method of claim 21, further comprising generating, via a second half adder, the previous propagate output and the previous generate output based on a first bit of the at least some of the plurality of MSBs, wherein the current propagate output and the current generate output are generated based on a second bit of the at least some of the plurality of MSBs, and wherein the second bit is a next lower order bit of the first bit in the first data.

23. The method of claim 21, further comprising generating, via a second half adder, the previous propagate output and the previous generate output based on MSBs of the at least some of the plurality of LSBs.

24. The method of claim 21, wherein the generating the partial sum output includes:

propagating, via at least one parallel PG component, the intermediate carry output or the serial generate output to a post carry output based on the serial propagate output; and summing at least the current propagate output and the post carry output.

25. An apparatus comprising:

means for generating an intermediate carry output based on at least some of a plurality of least significant bits (LSBs) of first data and second data;

means for generating a current propagate output and a current generate output based on at least some of a plurality of most significant bits (MSBs) of the first data and the second data, wherein a number of the at least some of the plurality of MSBs is different from a number of the at least some of the plurality of LSBs;

means for generating a serial propagate output and a serial generate output based on at least the current propagate output and the current generate output; and means for generating a partial sum output based on at least the serial propagate output, the serial generate output, the current propagate output, and the intermediate carry output.

26. The apparatus of claim 25, wherein the means for generating the intermediate carry output is further configured to generate the intermediate carry output in concurrent with at least one of the generating the current propagate output and the current generate output or the generating the serial propagate output and the serial generate output.

27. The apparatus of claim 25, wherein the means for generating the serial propagate output and the serial generate output is further configured to:

propagate the current propagate output or a previous propagate output to the serial propagate output based on the current propagate output; and propagate the current generate output or a previous generate output to the serial generate output based on the current propagate output.

28. The apparatus of claim 27, further comprising means for generating the previous propagate output and the previous generate output based on a first bit of the at least some of the plurality of MSBs, wherein the current propagate output and the current generate output are generated based on a second bit of the at least some of the plurality of MSBs, and wherein the second bit is a next lower order bit of the first bit in the first data.

29. The apparatus of claim 27, further comprising means for generating the previous propagate output and the previous generate output based on MSBs of the at least some of the plurality of LSBs.

30. The apparatus of claim 27, wherein the means for generating the partial sum output is further configured to:

propagate the intermediate carry output or the serial generate output to a post carry output based on the serial propagate output; and sum at least the current propagate output and the post carry output.

* * * * *